(12) United States Patent
Lee

(10) Patent No.: US 7,929,075 B2
(45) Date of Patent: Apr. 19, 2011

(54) LIQUID CRYSTAL DISPLAY MODULE AND ASSEMBLING METHOD THEREOF

(75) Inventor: Sang Bum Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 159 days.

(21) Appl. No.: 12/265,856

(22) Filed: Nov. 6, 2008

(65) Prior Publication Data

US 2009/0122221 A1 May 14, 2009

(30) Foreign Application Priority Data

Nov. 13, 2007 (KR) .......................... 10-2007-115240

(51) Int. Cl.
*G02F 1/1333* (2006.01)
(52) U.S. Cl. .......................................... 349/58; 362/633
(58) Field of Classification Search .................... 349/58; 362/632–634
See application file for complete search history.

(56) References Cited

U.S. PATENT DOCUMENTS

| | | | |
|---|---|---|---|
| 7,460,194 B2 * | 12/2008 | Tsukamoto | 349/60 |
| 7,573,540 B2 * | 8/2009 | Katsuda et al. | 349/58 |
| 7,671,936 B2 * | 3/2010 | Chang | 349/65 |
| 7,724,316 B2 * | 5/2010 | Maruyama et al. | 349/58 |
| 7,782,419 B2 * | 8/2010 | Hahm et al. | 349/61 |
| 2003/0234895 A1 * | 12/2003 | Sugawara et al. | 349/58 |

* cited by examiner

*Primary Examiner* — Mark A Robinson
*Assistant Examiner* — Eric Wong
(74) *Attorney, Agent, or Firm* — Brinks Hofer Gilson & Lione

(57) ABSTRACT

A liquid crystal display module and an assembling method thereof are disclosed. The liquid crystal display module includes a panel guide for supporting a liquid crystal panel, the panel guide including a first fastening portion, support side members for holding opposite sides of a lamp irradiating light to the liquid crystal panel, respectively, each of the support side members including a second fastening portion having a foreign substance shield, and a bottom case including a third fastening portion having a case hole formed through a side surface of the bottom case, to receive the foreign substance shield.

5 Claims, 3 Drawing Sheets

LIQUID CRYSTAL DISPLAY MODULE AND ASSEMBLING METHOD THEREOF

This application claims the benefit of the Korean Patent Application No. P2007-115240, filed on Nov. 13, 2007, which is hereby incorporated by reference as if fully set forth herein.

BACKGROUND OF THE INVENTION

1. Field of the Invention

The present invention relates to a liquid crystal display module, and more particularly, to a liquid crystal display module and an assembling method thereof which are capable of simplifying an assembling process for the liquid crystal display module while preventing foreign substance from entering the interior of the liquid crystal display module upon fastening screws to the liquid crystal display module.

2. Discussion of the Related Art

With the progress of an information-dependent society, the demand for various display devices has increased. To meet such a demand, efforts have recently been made to research flat panel display devices such as liquid crystal display (LCD) devices, plasma display panels (PDPs), electro-luminescent display (ELD) devices, vacuum fluorescent display (VFD) devices, and the like. Some types of such flat panel display devices are being practically applied to various appliances for display purposes.

In particular, LCDs have been used as a substitute for cathode ray tubes (CRTs) in association with mobile image display devices because LCDs have advantages of superior picture quality, lightness, thinness, and low power consumption. Thus, LCDs are currently most widely used. Various applications of LCDs are being developed in association with not only mobile image display devices such as monitors of notebook computers, but also monitors of TVs to receive and display broadcasting signals, and monitors of laptop computers.

Generally, an LCD device includes a liquid crystal display module or LCM, and a driving circuit for driving the liquid crystal display module.

The liquid crystal display module includes a liquid crystal panel, and a backlight unit for irradiating light to the liquid crystal panel. The liquid crystal display module also includes top and bottom cases defining a space for receiving the backlight unit and liquid crystal panel.

The liquid crystal display module further includes a panel guide enclosing respective edges and respective side surfaces of a diffusion plate and a plurality of optical sheets, which are included in the backlight unit, and a support side member enclosing opposite ends of lamps included in the backlight unit. The panel guide and support side member are fastened to the bottom case by screws.

In detail, the support side member is fastened to the bottom case, and the panel guide is then fastened to both the bottom case and the support side member fastened to the bottom case. In this case, accordingly, a fastening process needs to be carried out twice. In the fastening process, insert nuts are also used. This increases the cost. Furthermore, a metallic foreign substance, which may be formed during the screw-fastening process, may enter the interior of the liquid crystal display module. The metallic foreign substance may generate an electrical short circuit with a printed circuit board mounted in the liquid crystal display module.

SUMMARY

A liquid crystal display module comprises: a panel guide for supporting a liquid crystal panel, the panel guide including a first fastening portion; support side members for holding opposite sides of a lamp irradiating light to the liquid crystal panel, respectively, each of the support side members including a second fastening portion having a foreign substance shield; and a bottom case including a third fastening portion having a case hole formed through a side surface of the bottom case, to receive the foreign substance shield.

In another aspect of the present invention, a method for assembling a liquid crystal module comprises: preparing a panel guide for supporting a liquid crystal panel, the panel guide including a first fastening portion, support side members for holding opposite sides of a lamp irradiating light to the liquid crystal panel, respectively, each of the support side members including a second fastening portion having a foreign substance shield, and a bottom case including a third fastening portion having a case hole formed through a side surface of the bottom case, to receive the foreign substance shield; aligning the panel guide, the support side members, and the bottom case such that the first to third fastening portions overlap; and fastening the first to third fastening portions by screws, and inserting the foreign substance shield into the case hole.

With the disclosed structure and method, the assembling process can be simplified because the panel guide, support side members, and bottom case are fastened at one time by screws or the like. Also, it is possible to prevent metallic foreign substance formed during the fastening of the screws from entering the interior of the liquid crystal display module, and thus to prevent printed circuit boards from being short-circuited by metallic foreign substance because the foreign substance shield is fitted in the case hole of the bottom case.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, a liquid crystal display module and an assembling method thereof according to an exemplary embodiment of the present invention will be described with reference to the accompanying drawings.

Figure 1:
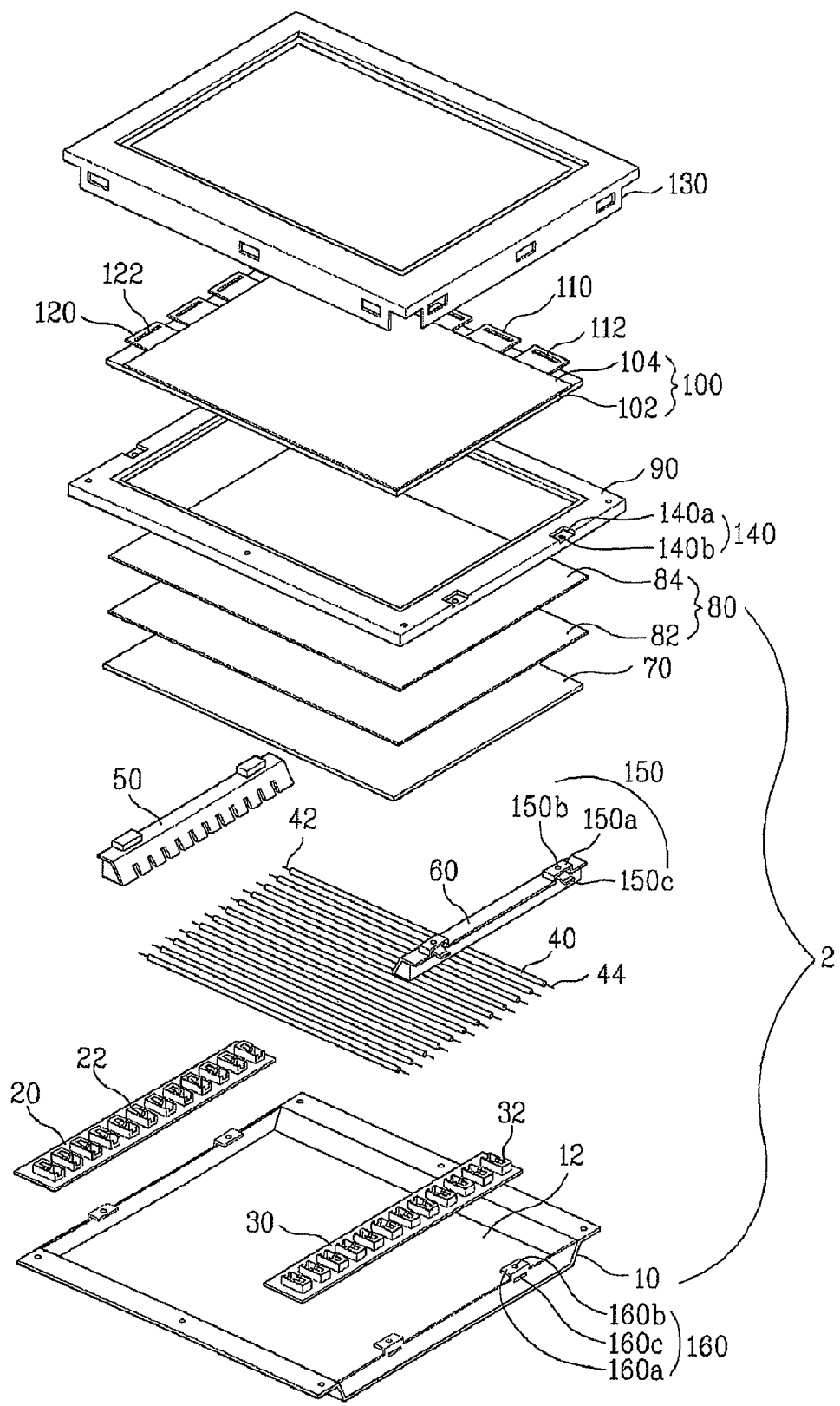
FIG. 1 is an exploded perspective view schematically illustrating a liquid crystal display (LCD) device according to an exemplary embodiment of the present invention, which includes a backlight unit.

FIG. 1 is an exploded perspective view schematically illustrating a liquid crystal display (LCD) device according to an exemplary embodiment of the present invention, which includes a backlight unit.

The LCD device shown in FIG. 1 includes a liquid crystal panel 100 for displaying an image, and a backlight unit 2 for supplying light to the liquid crystal panel 100. The LCD device also includes a top case 130 and a bottom case 10, which receive the liquid crystal panel 100 and backlight unit 2.

The top case 130 has a bent structure to enclose a non-display area of the liquid crystal panel 100 and side surfaces of the bottom case 10. The top case 130 is fastened to a panel guide 90, which encloses the side surfaces of the bottom case 10.

The liquid crystal panel 100 is seated on the panel guide 90. The liquid crystal panel 100 controls the transmittance of light supplied from the backlight unit 2 in accordance with an input image signal, to display an image. The liquid crystal panel 100 includes a lower substrate 102, an upper substrate 104, a liquid crystal layer (not shown) formed between the lower substrate 102 and the upper substrate 104, and spacers (not shown) for maintaining a certain spacing between the lower substrate 102 and the upper substrate 104.

The upper substrate 104 includes color filters, a black matrix, and common electrodes.

The lower substrate 102 includes thin film transistors, and pixel electrodes respectively connected to the thin film transistors. The common electrodes, which are provided at the upper substrate in the illustrated case, may be formed at the lower substrate 102 in accordance with a liquid crystal mode different from that of the illustrated case.

Formed on the non-display area of the lower substrate 102 are data pad areas respectively connected to data lines (not shown) and gate pad areas respectively connected to gate lines (not shown). A plurality of data circuit films 110, on which data integrated circuits 112 are mounted to supply image signals to the data lines, are attached to the data pad areas, respectively. A plurality of gate circuit films 120, on which gate integrated circuits 122 are mounted to supply gate scan signals to the gate lines, are attached to the gate pad areas, respectively.

Otherwise, the data integrated circuits 112 and gate integrated circuits 122 may be directly mounted on the lower substrate 102 in accordance with a chip-on-glass (COG) method, or may be formed together with the thin film transistors of the lower substrate 102 such that they are built in the lower substrate 102.

The backlight unit 2 includes a plurality of lamps 40 each having first and second electrodes 42 and 44, a first socket unit including a plurality of first sockets 22 connected to respective first electrodes 42 of the lamps 40, and a second socket unit including a plurality of second sockets 32 connected to respective second electrodes 44 of the lamps 40. The backlight unit 2 also includes a diffusion plate 70 arranged beneath the panel guide 90 such that the diffusion plate 70 faces the lamps 40, at least one optical sheet 80 arranged on the diffusion plate 70, a first support side member 50 arranged at one side of the bottom case 10, to enclose the first socket unit and one end of each lamp 40, and a second support side member 60 arranged at the other side of the bottom case 10, to enclose the second socket unit and the other end of each lamp 40.

The diffusion plate 70 diffuses light irradiated from the lamps 40 over the entire region of the liquid crystal panel 100.

The optical sheet 80 functions to cause the light diffused by the diffusion plate 70 to be vertically irradiated to the liquid crystal panel 100. To this end, the optical sheet 80 may include at least one prism sheet for condensing the light diffused by the diffusion plate 70. In the illustrated case, the optical sheet 80 includes two prism sheets 82 and 84.

The first and second socket units are arranged on first and second printed circuit boards (PCBs) 20 and 30, respectively. Each of the PCBs 20 and 30 is provided with a common line to supply a lamp driving voltage.

The lamps 40 are separably mounted between the sockets 22 and 32 respectively mounted on the first and second PCBs 20 and 30 such that the lamps 40 face the liquid crystal panel 100. Each lamp 40 may be a cold cathode fluorescent lamp (CCFL). Each lamp 40 is turned on by a lamp driving voltage supplied from the associated sockets 22 and 32, to irradiate light to the liquid crystal panel 100.

Although not shown, a lamp tube, in which phosphors emit light in accordance with gas discharge, or an external electrode fluorescent lamp (EEFL), in which electrodes are arranged on an outer surface of a lamp tube body at opposite ends of the lamp tube body, may be used for each lamp 40. In this case, the structure of each socket may be changed.

The panel guide 90 is mounted on a seat portion of the bottom case 10 such that the panel guide 90 can enclose not only the edges and side surfaces of the diffusion plate 70 and optical sheets 80, but also the side surfaces of the bottom case 10. The panel guide 90 also functions to support the liquid crystal panel 100, to prevent the backlight unit 2 from moving, and to absorb external impact applied to the backlight unit 2.

The bottom case 10 is manufactured to have a bottom surface facing the lamps 40, and inclined surfaces upwardly inclined from the bottom surface by a certain inclination. A reflection sheet 12 is attached to the bottom surface and inclined surfaces of the bottom case 10, in order to reflect light irradiated from each lamp 40 toward the liquid crystal panel 100. Alternatively, a reflective material may be coated over the bottom surface and inclined surfaces of the bottom case 10.

Figure 2:
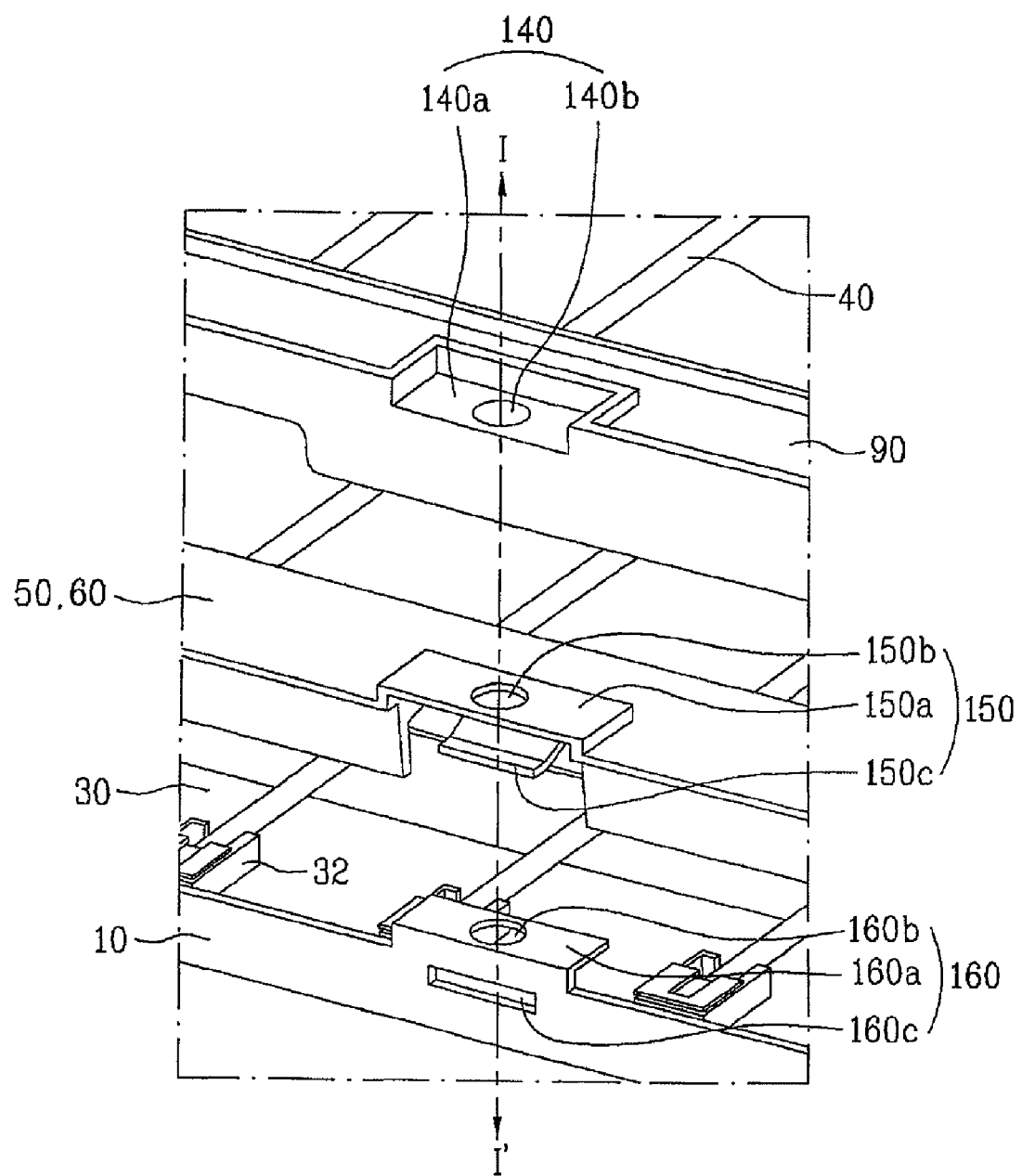
FIG. 2 is an exploded perspective view for explaining a fastening process for a panel guide, support side members, and a bottom case.

FIG. 2 is an exploded perspective view for explaining a fastening process for the panel guide 90, support side members 50 and 60, and bottom case 10.

As shown in FIG. 2, the panel guide 90 includes at least one first fastening portion 140 formed on at least one side surface of the panel guide 90, in order to enable the panel guide 90 to be fastened with the support side members 50 and 60, and bottom case 10. The first fastening portion 140 has a first fastening surface 140a recessed from the upper surface of the panel guide 90 in a stepped state, and a first fastening hole 140b formed through the first fastening surface 140a.

Each of the support side members 50 and 60 includes a second fastening portion 150, which will be fastened to the first fastening portion 140. The second fastening portion 150 has a second fastening surface 150a protruded from the surface of the associated support side member 50 or 60 in a stepped state such that the second fastening surface 150a corresponds to the first fastening surface 140a, a second fastening hole 150b formed through the second fastening surface 150a such that the second fastening hole 150b corresponds to the first fastening hole 140b, and a foreign substance shield 150c extending inclinedly from the second fastening surface 150a toward the bottom case 10, to prevent foreign substance from entering the interior of the liquid crystal display module. One end 15a of the foreign substance shield 150c is arranged to be nearer to a light emitting region of the lamps 40 than the second fastening hole 150b. The other end 15b of the foreign substance shield 150c is inserted into a case hole 160c provided at the bottom case 10.

The bottom case 10 includes a third fastening portion 160 formed on at least one side surface of the bottom case 10, in order to enable the bottom case 10 to be fastened with the first and second fastening portions 140 and 150. The third fastening portion 160 has a third fastening surface 160a extending from one surface of the bottom case 10 to the interior of the liquid crystal display module in a bent state such that the third fastening surface 160a corresponds to the first and second fastening surfaces 140a and 150a, and a third fastening hole 160b formed through the third fastening surface 160a such that the third fastening hole 160b corresponds to the first and second fastening holes 140b and 150b. The case hole 160c is also included in the third fastening portion 160. The case hole 160c is formed through one side surface of the bottom case 10 such that the foreign substance shield 150c can be inserted into the case hole 160c.

The fastening portions 140 and 160 of the panel guide 90 and bottom case 10 may be formed at four side surfaces, in order to obtain a maximum fastening force.

Figure 3:
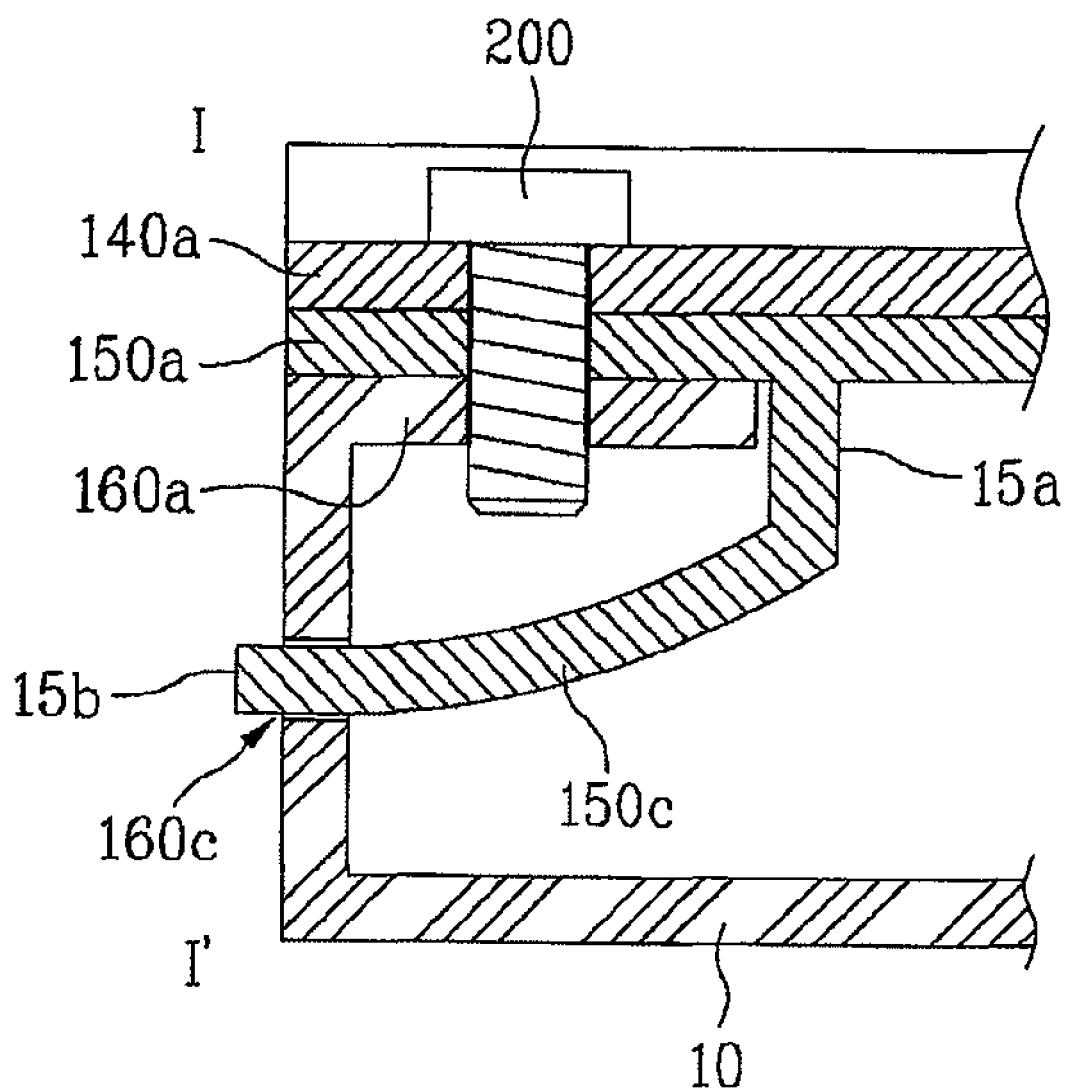
FIG. 3 is a cross-sectional view taken along the line I-I in FIG. 2, illustrating the fastened panel guide, support side members, and bottom case.

The corresponding first to third fastening holes 140b, 150b, and 160b are fastened at one time by a screw 200 or the like, as shown in FIG. 3. At the same time, the other end 15b of the foreign substance shield 150c is inserted into the case hole 160c of the bottom case 10.

Thus, the assembling process can be simplified because the panel guide 90, support side members 50 and 60, and bottom case 10 are fastened at one time by a screw or the like, as described above. Also, it is possible to prevent metallic foreign substance formed during the fastening of the screw 200 from entering the interior of the liquid crystal display module, because the foreign substance shield 150c is fitted in the case hole 160c of the bottom case 10. Since the fastening of the screw 200 is achieved through the fastening holes 140b, 150b, and 160b, it is unnecessary to additionally use an insert net for the fastening of the screw 200, as compared to related art's cases. Accordingly, a reduction in material costs is achieved.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display module comprising:
    a panel guide that supports a liquid crystal panel, the panel guide including a first fastening portion having a first fastening surface and a first fastening hole;
    support side members that hold opposite sides of a lamp irradiating light to the liquid crystal panel, respectively, each of the support side members including a second fastening portion having a second fastening surface, a second fastening hole corresponding to the first fastening hole, and a foreign substance shield;
    a bottom case including a third fastening portion having a third fastening surface, a third fastening hole corresponding to the first and second fastening holes, and a case hole formed through a side surface of the bottom case, to receive the foreign substance shield; and
    a screw inserted into the first to third fastening holes,
    wherein the foreign substance shield extends from the second fastening surface toward the bottom case, and
    wherein an end portion of the screw inserted into the first to third fastening holes is surrounded by the foreign substance shield.

2. The liquid crystal display module according to claim 1, wherein
    the first fastening surface is recessed from an upper surface of the panel guide in a stepped state; and
    the first fastening hole is formed through the first fastening surface.

3. The liquid crystal display module according to claim 2, wherein
    the second fastening surface is protruded from an upper surface of the support side member in a stepped state such that the second fastening surface corresponds to the first fastening surface; and
    the second fastening hole is formed through the second fastening surface.

4. The liquid crystal display module according to claim 3, wherein the foreign substance shield has one end nearer to a light emitting region of the lamp than the second fastening hole, and the other end inserted into the case hole.

5. The liquid crystal display module according to claim 3, wherein the third fastening portion has:
    the third fastening surface extends from the side surface of the bottom case to the lamp in a bent state; and
    the third fastening hole is formed through the third fastening surface.

* * * * *